3,473,939
DIRECT-BONDED PERICLASE REFRACTORIES
AND PROCESS OF PREPARING SAME
Marshall L. Mayberry and Jacques R. Martinet, San Jose, Calif., assignors to Kaiser Aluminum & Chemical Corporation, Oakland, Calif., a corporation of Delaware
Continuation of application Ser. No. 482,566, Aug. 25, 1965. This application Apr. 10, 1967, Ser. No. 629,818
Int. Cl. C04b 35/04, 35/20, 35/24
U.S. Cl. 106—58   10 Claims

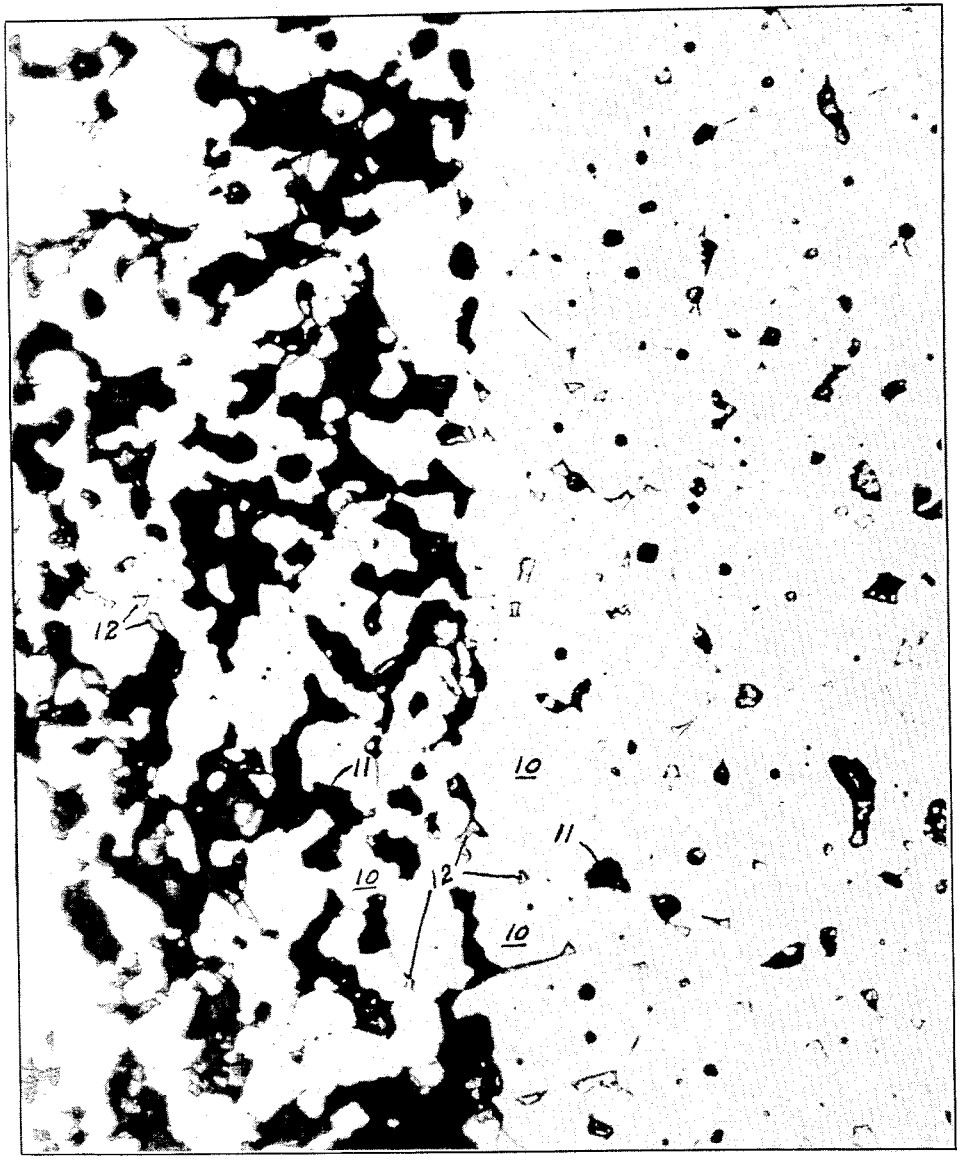

ABSTRACT OF THE DISCLOSURE

Direct-bonded refractories consisting of (a) periclase particles containing at least 97.5 MgO, from about 0.1% to 0.25% chromium as $Cr_2O_3$, not over about 0.5% ferric oxide plus alumina, (b) from about 0.3 to about 0.6% silica, and (c) from about 0.52% to about 1.6% CaO to provide a lime-to-silica ratio of from about 1.75:1 to about 2.6:1.

---

This application is a continuation of application Ser. No. 482,566, filed Aug. 25, 1965, and now abandoned.

This invention relates to a basic refractory material and shaped product; and more particularly, it relates to such material and shaped product containing very high amounts of magnesium oxide.

In the operation of metallurgical furnaces, particularly steel furnaces, and more especially those wherein the basic oxygen process is operated, the temperatures of operation have been ever increasing. This has necessitated a search for refractories which are stable toward furnace atmospheres and which exhibit good load-bearing strength at high temperatures, such as those found in the operation of these furnaces. However, not only is the final fired strength important, but it is also important that the product have good cold strength and that good strength be maintained as the brick is heated up through intermediate temperatures, e.g., to the firing tmperature or the temperature of operation, during which time, when placed in a furnace wall, for instance, the brick is sustaining a substantial load and it is important that the brick does not break at some zone back of the hot face where the temperature is less than the hot face temperature. At the same time, the use of refractories having high fusion or melting points is essential and in this regard a refractory which is high in magnesium oxide is particularly desirable because this substance, when pure, has a melting point approaching or about 2800° C. It is desired, particularly with high magnesia refractories, to attain high intermediate strength and to insure minimum deformation or creep of the brick during the heating up period and while they are under load. This latter quality has been a problem whether it is a chemically or cold-bonded brick or whether it is a prefired brick.

According to the present invention it has now been discovered that an excellent and strong refractory product or shape is obtained by admixing magnesia grain containing at least 97.5% magnesium oxide and from 0.1% to 0.25% chromium material expressed as $Cr_2O_3$ uniformly disposed through the grain, in the usual brick-making graded sizes, including finely divided magnesia, and from 0.1% to 0.2% finely divided silica substantially entirely passing through a 100 mesh screen and a major portion passing a 325 mesh screen, and sufficient calcium oxide-providing compound to provide a lime-to-silica ratio of from about 1.75/1 to 2.6/1. With this admixture there is incorporated, based on the total dry weight of the batch, from 1% to 3% of a chemical or cold bonding agent, for example, lignin, or waste sulfite liquor. The batch is tempered with water, formed into space and fired to form the shaped fired product of this invention. The shaped fired products so obtained exhibit excellent strengths, i.e., of at least 1050 p.s.i. modulus of rupture at 1260° C., after firing. The fired product so obtained is particularly characterized by direct bonding of the periclase particles to each other in the mass, and by the presence of discrete, discontinuous zones of dicalcium silicate. These zones are suitably uniformly disposed throughout the shape but can also be in random distribution therethrough.

It has been known from Austin, U.S. 2,571,101, issued Oct. 16, 1951, that dense and strong periclase refractories can be produced which are characterized by direct periclase crystal-to-periclase crystal bonding or attachment and that this tends to realize in a finished refractory product the maximum magnesia strength available because there is no continuous film of lower melting constituent in such a product intervening between periclase crystals to cause early softening and failure. However, it is also known in practice that chemically pure magnesia is not available for the production of magnesia refractories but that the magnesia material which is derived from natural sources such as ores, bitterns, sea water or other available sources, always contains some amount of impurities, including for the most part lime, silica, ferric oxide and alumina. Iron oxide and alumina tend to form spinels with periclase; but lime and silica form chemical combinations with each other and sometimes additionally with magnesia and these inclusions affect the physical properties of magnesia or periclase bricks or other refractory products. This is believed to be because the various compounds of lime and silica with each other or together with magnesia have appreciably lower softening or melting points than the magnesia and tend to reduce the strength or stability of the periclase refractory product in which they are present. Attempts have been made to overcome the effect of lime and silica. Particularly, where these components have been found to be present in approximately 1 to 1 ratio by weight in a high purity magnesia grain wherein silicate filming around the periclase had occurred due to the method of manufacture of such grain, prior art attempts to correct the filming during the production of brick from such grain and to secure segregation of the silicate material into discrete, discontinuous zones within the refractory shape have not been successful. One method which has been tried without success has been to add 1% finely divided chromium oxide in the brick mix. Failure has been reported in such an attempt and it has been found by prior art workers that such a procedure has not appreciably increased the hot strength measured at 2300° F.

Applicants have now found, however, that when the periclase employed as starting grain material in a brick mix is one which contains small amounts of chromium material as described above, there can also be incorporated in the brick mix lime and silica in proportions to form dicalcium silicate and that in the finally fired product such dicalcium silicate is found present in discrete, discontinuous zones distinct from the periclase particles. It is believed that the very small amounts of chromium material which are present in the periclase grain so affect the surface energy of the grain that the dicalcium silicate formed is forced to segregate itself into pools or zones within the structure and thereupon the periclase particles preferentially attach themselves to each other. This is advantageous for several reasons. For instance, dicalcium silicate has the highest fusion or softening point of any of the calcia-silica compounds known in this two-phase oxide system. Thus, applicants now teach a structure wherein highly refractory dicalcium silicate is present but is segregated and the structure is characterized in that a major proportion of the periclase particles are directly bonded or attached to other periclase particles in the structure, and the periclase particles are for the major portion free of any silicate film. As a result of the structure of the present invention, refractories are produced which exhibit a marked increase in strength and hot modulus of rupture, measured at 1260° C. This good result is believed to flow in part from the physical structure of the product produced herein, that is, from the relationship and placement of the periclase particles in combination with the dicalcium silicate zones.

The magnesia or periclase grain material employed as starting material to form the refractory batch from which such shapes are made is a periclase or deadburned magnesia containing at least 97.5% magnesium oxide and from 0.1 to 0.25% chromium material expressed as $Cr_2O_3$ and not over about 0.5% of ferric oxide plus alumina. There may also be present small amounts of other consituents, e.g. $B_2O_3$, $Na_2O$, etc.; and there are also present small amounts of lime and silica, in about a dicalcium silicate ratio, or preferably $2CaO.CiO_2$. The silica preferably does not exceed 0.5% in this grain.

Such a periclase or magnesia grain, which for convenience will hereafter be referred to as periclase, is suitably made by deadburning high purity magnesium hydroxide or magnesium carbonate or other material which upon such deadburning will yield magnesium oxide. The magnesium hydroxide employed to form such grain can, for example, be produced by reacting the dilute magnesium salt containing brine such as sea water with an alkaline reagent, for instance, dry calcined dolomite, to precipitate magnesium hydroxide. The precipitated magnesium hydroxide is washed, filtered and then in one preferred method of operation is calcined at about 1000 to 1100° C. to form active magnesia. The active magnesia recovered from the calcining zone is then admixed with chromium material, such as finely divided chromite ore, finely divided chromium oxide, or chromic acid, and is admixed with an amount of water to at least partially rehydrate the magnesia, the admixture is then briquetted under high pressure to form compact bodies which are fed to a rotary kiln and fired to deadburn. The latter method of production is broadly described, for instance, in Hicks et al. U.S. 2,571,134 issued Oct. 16, 1951. The periclase so produced is characterized by high purity or MgO content, of the composition described above, and by direct periclase-to-periclase crystal bonding within the particle.

In producing shapes from the above-described periclase grains, the grains in the usual brick-making graded sizes are mixed with from 0.1% to 0.2% of finely divided silica, substantially entirely passing 325 mesh, and with sufficient CaO material, e.g., hydrated lime or calcium hydroxide, to form with all of the silica in the mix dicalcium silicate. Silica employed can be, for example, pumicite or a product known as volatilized silica which is produced by reaction between silica, carbon and iron to form ferrosilicon and a vaporous or fume product from which the finely divided silica is recovered as a deposit. Such volatilized silica is characterized by an amorphous state and by a specific surface of about 67,500 square centimeters per gram. However, it is satisfactory to use pumicite, diatomaceous earth such as Celite, or other silica material of particle size substantially all passing 100 mesh and a major portion passing a 325 mesh screen. These latter powders also exhibit high specific surface.

The CaO-providing compound can be that obtained from any source, so long as its purity is such that the final fired refractory product will exhibit the purity described herein. Hydrated lime or Ca hydroxide has been found to be especially advantageous in that it blends smoothly into the mix and assists in pressing to high desnity. It is preferred that the hydrated lime be free of lumps and especially that this material substantially all be finer than 200 mesh. However, lime or Ca carbonate or other calcium compound which upon heating forms CaO is also useful, preferably of like particle size. The invention will be described with respect to hydrated lime as the CaO component.

In producing fired shaped products according to the present invention, the periclase particles in brick-making graded sizes as known to this art, are thoroughly mixed in a muller mixer and there is then added thereto the finely divided silica in the amount described and the hydrated lime, the latter preferably substantially entirely passing 200 mesh and with a major proportion or over 50% thereof passing through a 325 mesh screen. With this admixture, the periclase particles including a minor amount, preferably 10% to 30%, of periclase passing 100 mesh, to form upon firing the ceramic bond in the known manner, there is admixed a cold or chemical bonding agent. In such mixture, it is preferred that there be employed from 15% to 30% minus 100 periclase. A suitable cold bond is lignin including waste sulfite liquor or lignin sulfonate, or it can be any other organic bonding agent which substantially entirely burns off upon firing, or it can suitably be a magnesium salt capable of forming a Sorel cement with the finely divided magnesia of the particle batch, particularly magnesium chloride or magnesium sulphate or an admixture of these two magnesium salts with each other which upon firing provide MgO in the final product. A tempering amount of water is also admixed with the batch. The lignin material or a water-soluble cold bonding agent where used can be incorporated in the form of a solution or slurry in the tempering water. The admixed batch is now formed into shapes in any desired manner, e.g., in a dry press or by vibration or in any other desired manner. The formed shapes are then fired to form the final fired product. Suitably the shapes are fired at a temperature of at least 1650° C. and preferably at from 1680° C. to 1750° C.

The following specific examples will illustrate modes of carrying out the present invention.

EXAMPLE 1

In making a novel brick for use, for example, in basic oxygen furnaces or other high temperature metallurgical installations, a batch is prepared containing size graded periclase grain aggregate and periclase grain fines of the same chemical composition, the fines being incorporated to form the ceramic bond upon firing. The periclase grain employed in this example has the following chemical composition:

| | Percent |
|---|---|
| $SiO_2$ | 0.4 |
| CaO | 0.9 |
| $Fe_2O_3$ | 0.2 |
| $Al_2O_3$ | 0.1 |
| $Cr_2O_3$ | 0.1 |
| MgO (by difference) | 98.3 |

The sizing of the periclase grain was as follows:

| | Percent |
|---|---|
| Passing 4 mesh and retained on 10 mesh | 44 |
| Passing 10 mesh and retained on 35 mesh | 20 |
| Passing 35 mesh and retained on 65 mesh | 9 |
| Passing 100 mesh | 27 |

With the above grain batch there is incorporated, in a muller mixer, 0.14% pumicite and 0.36% hydrated lime ($Ca(OH)_2$) to provide, respectively, 0.11% $SiO_2$ and 0.27% CaO, and there is also added about 1% of a lignin sulfonate as a bonding agent. The analysis of the pumicite employed is as follows: 77.68% $SiO_2$, 8.28% $Al_2O_3$, 0.7% $Fe_2O_3$, 0.36% CaO, 1.88% $Na_2O$, 5.30% $K_2O$, about 0.35% MgO, the product exhibiting an ignition loss at 1000° C. of 5.28%. In other words, there are added as constituents of the pumicite about 0.11% $SiO_2$, 0.01% $Al_2O_3$, 0.01% $K_2O$ and traces of CaO and the other elements present. The hydrated lime all passes a 200 mesh screen; and the pumicite all passes 100 mesh and over 50% passes 325 mesh.

The periclase material, pumicite and hydrated lime are thoroughly mixed with the addition of a tempering amount of water, the lignin material being pre-mixed with the water and added as a slurry therein. The total amount of water added is about 3%. The mixture is then formed into bricks in a dry press under a pressure of approximately 10,000 lbs. per square inch.

The overall analysis of the final brick on the fired basis, at 1700° C., is: 0.5% $SiO_2$, 1.3% CaO, 0.2% $Fe_2O_3$, 0.1% $Al_2O_3$, 0.1% $Cr_2O_3$, approximately 0.2% $B_2O_3$ plus $Na_2O$ and $K_2O$, and (by difference) 97.6% MgO. The bricks are dried, cured and fired in a tunnel kiln at 1700° C. for 6 hours. After such firing the bricks are tested to determine the modulus of rupture at 1260° C. and an average of 4 samples exhibited a modulus of rupture at this temperature of 1103 lbs. per square inch. A comparative hot modulus of rupture investigation was carried out on a periclase brick containing over 96% MgO and characterized by direct bonding between the periclase particles but differing from the product of this invention in that no dicalcium silicate was found to be present and the modulus of rupture at 1260° C. was found to be, on an average of 4 tests, about 940 lbs. per square inch. In other words, the product of the present invention exhibits a substantial increase in strength under these conditions, and this increase has been consistently exhibited by fired products made according to the present invention.

EXAMPLE 2

Another batch is made up of periclase grain of the following chemical analysis: 0.33% $SiO_2$, 0.9% CaO, 0.2% $Fe_2O_3$, 0.1% $Al_2O_3$, 0.20% $B_2O_3$ plus $Na_2O$, 0.10% $Cr_2O_3$, and 98.17% magnesium oxide (by difference). The periclase is employed in the following sizing:

|  | Percent |
| --- | --- |
| Passing 4 and retained on 10 mesh | 42.5 |
| Passing 10 and retained on 35 mesh | 22.3 |
| Passing 35 and retained on 65 mesh | 7.7 |
| Passing 100 mesh | 27.5 |

With this periclase material there is admixed 0.13% volatilized silica and 0.39% calcium hydroxide, the latter all passing a 200 mesh screen. The whole is thoroughly admixed and is tempered with 2.5% of water containing in suspension 1%, based on total dry weight of the batch, of lignin sulfonate. When the batch is thoroughly mixed bricks of the size of 9" x 4½" x 3" are made therefrom in a dry press under a pressure of 10,000 lbs. per square inch, and are dried, cured and then fired at 1700° C. for about 6 hrs. The modulus of rupture at 1260° C. is found to be 1097 p.s.i.

The bricks of both of the above examples exhibit periclase-to-periclase bonding over a major portion of a representative thin section and discrete, discontinuous zones of segregated dicalcium silicate which upon examination by petrographic microscope appear to be small areas occluded within or surrounded by the periclase grains in the structure. A photomicrograph prepared on a petrographic microscope at magnification of 450 is shown in the figure as a typical representation of the product of the present invention, and the sample was made according to Example 2, above, except that the volatilized silica and calcium hydroxide are employed in the amounts, respectively of 0.11% and 0.36%. In the figure, 10 are periclase crystals, 11 are voids (the dark areas) and 12 are segregated silicates (light, grayish areas). These silicates are essentially present as dicalcium silicate, but there may be traces of tricalcium silicate also present.

As a strength comparison with prior art brick of high purity periclase grain, a brick batch was made of periclase grain of the chemical analysis shown in Example 1 hereof, the periclase particles being of the usual brick making graded sizes, and including 28.4% ball milled fines, all passing 100 mesh and 65% of this amount passing 325 mesh, and there were added in the brick batch 2.5% of water as tempering liquid and 1% lignin sulfonate as chemical bond. No finely divided silica and no calcium oxide-providing compound were added in the mix. The bricks were pressed in a dry press at about 13.5 tons per sq. inch pressure, were dried and then were fired at 1700° C. with a 12 hour soak at this temperature. The modulus of rupture at 1260° C. of this batch averaged less than 500 lbs. per sq. inch.

In addition or alternatively to the cold or chemical bonds which have previously been described in this specification, there can be employed as a cold bonding agent about 0.5% to 1.25% of a water-soluble phosphate of an alkaline or alkali earth metal, such as sodium, potassium, lithium or ammonium, calcium or the like. Such a phosphate is preferably used in an amount of from 1.0% to 1.1%. A particular advantage of the incorporation of a polyphosphate, e.g., sodium or potassium tripolyphosphate, is that the cold crushing strength of an unburned brick is greatly improved; but it is especially advantageous to incorporate any phosphate bond in a brick which is fired prior to installation in a furnace lining because the brick so made exhibits excellent hot load strength and hot modulus of rupture. In one test, bricks are made up and fired exactly as in Example 2 above, except that there is also added in the starting batch 1.1%, based on total dry weight of the batch, of potassium tripolyphosphate. The modulus of rupture at 1260° C. of these brick is found to be 1366 p.s.i. and when tested at a still higher temperature, i.e., 1400° C., is found to be 1329 p.s.i. The combination of the grain containing at least 97.5% MgO and containing the amount of $Cr_2O_3$ shown, the dicalcium silicate in segregated zones and the phosphate inclusion in the fired brick, results in exceptional and unexpectedly high hot modulus of rupture characteristics especially at 1400° C.

It is to be understood that the bricks or shaped products which have been made and fired as described above can also be impregnated with tar or pitch prior to installation in a furnace such as a basic oxygen furnace.

Fired brick shapes or products made according to this invention exhibit on the fired or oxide basis, that is tar-free, a chemical analysis of from about 0.3% to 0.6% silica, not over about 0.5% ferric oxide plus alumina, from about 0.52% to about 1.6% CaO, from 0.1% to about 0.25% $Cr_2O_3$ and at least, preferably over, 97% MgO, and contain dicalcium silicate distributed therethrough in discrete, discontinuous zones, the periclase particles in such product being predominantly directly bonded to other periclase particles therein.

In conformity with common practice in reporting chemical analyses of refractory materials, in the specification and claims the proportions of the various chemical constituents present in a material are given as though these constituents were present as the simple oxides. Thus, the magnesium constituent is referred to as magnesium oxide or MgO, the silicon content as silica, silicon dioxide or $SiO_2$, and so on for other elements reported, although the silica or chrome or other element or oxide may be present in combination with a very small proportion of the MgO, or with each other. That is to say, the term "0.5% $SiO_2$," or "of silicon expressed or calculated as $SiO_2$" is intended to mean that a chemical analysis of the material referred to would show the silicon content as $SiO_2$, although it may be present as a calcium silicate or in some other combination. In mixing batches according to this invention a tempering amount of water or liquid is used according to well-known good practice in this art, e.g., 2 to 3.5% or as desired. Percentages given in this specification and in the appended claims are percentages by weight unless otherwise indicated. Particle sizes given are those of Tyler screens as set forth, e.g., in "Chemical Engineers Handbook," John H. Perry, Editor-in-Chief, second edition, McGraw-Hill Book Company 1941, at page 1719. The modulus of rupture is determined according to A.S.T.M. Standards, Designation C133-35, except that the specimens are tested in a furnace which maintains them at a temperature of 1260° C. or 1400° C., or as indicated.

Having now described the invention, we claim:

1. A lining for a high temperature metallurgical furnace comprising a plurality of fired refractory shapes, each of said shapes consisting essentially of (a) periclase particles at least 97.5% MgO on the fired basis, from about 0.1% to 0.25% chromium expressed as $Cr_2O_3$, and not over about 0.5% ferric oxide plus alumina, (b) from about 0.3% to about 0.6% silica, and (c) from about 0.52% to about 1.6% CaO to provide a lime-to-silica ratio of from about 1.75/1 to about 2.6/1, (d) a major portion of said periclase particles being bonded directly to other such periclase particles in said shape, and (e) said lime being substantially all present in combination with said silica as discrete, discontinuous zones of dicalcium silicate dispersed through said shape, said shapes having a modulus to rupture at 1260° C. of at least 1050 p.s.i.

2. A lining for a basic oxygen furnace comprising a plurality of tar impregnated basic refractory bricks, each of said bricks consisting essentially of, on the oxide basis, (a) periclase particles containing at least 97.5% MgO, from about 0.1 to 0.25% chromium expressed as $Cr_2O_3$ and not over about 0.50% ferric oxide plus alumina, (b) from about 0.3 to 0.6% silica, and (c) sufficient CaO to provide a lime-to-silica ratio of from about 1.75/1 to about 2.6/1, (d) a major portion of said periclase particles being bonded directly to other such periclase particles in said brick, and (e) said lime being substantially all present in combination with said silica as discontinuous zones of dicalcium silicate dispersed throughout said brick, said brick having a modulus of rupture at 1260° C. of at least 1050 p.s.i.

3. A fired basic refractory shape consisting essentially of (a) periclase particles containing at least 97.5% MgO, from about 0.1 to 0.25% chromium expressed as $Cr_2O_3$ and not over about 0.5% ferric oxide plus alumina, (b) from about 0.3% to 0.6% silica, and (c) sufficient CaO to provide a lime-to-silica ratio of from about 1.75/1 to about 2.6/1, (d) a major portion of said periclase particles being bonded directly to other such periclase particles in said shape, and (e) said lime being substantially all present in combination with said silica as discontinuous zones of dicalcium silicate, (f) said shape having a modulus of rupture of at least 1050 p.s.i. at 1260° C.

4. A tar impregnated, fired basic refractory shape consisting essentially of (a) periclase particles containing at least 97.5% MgO, from about 0.1 to 0.25% chromium expressed as $Cr_2O_3$, and not over about 0.5% ferric oxide plus alumina, all on the oxide basis, (b) from about 0.3% to 0.6% silica, and (c) sufficient CaO to provide a lime-to-silica ratio from about 1.75/1 to about 2.6/1, (d) a major proportion of said periclase particles being bonded directly to other such periclase particles in said shape, and (e) said lime being substantially all present in combination with said silica as discontinuous zones of dicalcium silicate uniformly distributed through the said shape, said amounts being expressed on the oxide basis, said shape having a modulus of rupture at 1260° C. of at least 1050 p.s.i.

5. A refractory batch for making shapes for use in high temperature furnaces consisting essentially of (a) periclase particles in brickmaking size ranges, a minor proportion of said periclase particles passing 100 mesh, (b) said periclase particles containing at least 97.5% MgO, from about 0.1% to about 0.25% $Cr_2O_3$ and not over about 0.5% $Fe_2O_3$ plus $Al_2O_3$, (c) from about 0.1% to about 0.2% silica substantially entirely passing 100 mesh and a major portion passing 325 mesh, and (d) sufficient calcium compound adapted to form CaO upon firing to provide a lime-to-silica ratio in the shape when fired of from 1.75/1 to 2.6/1, (e) said calcium compound substantially entirely passing 200 mesh.

6. Refractory batch as in claim 5 wherein said calcium compound is calcium hydroxide.

7. Refractory batch as in claim 5 wherein said silica is pumicite.

8. Refractory batch as in claim 5 wherein said silica is volatilized silica.

9. A periclase-containing refractory batch for making fired shapes for use in high temperature metallurgical furnaces, said fired shapes being characterized in that periclase particles are directly bonded to other periclase particles therein, said batch consisting essentially of (a) periclase particles containing at least 98% MgO, about 0.1% $Cr_2O_3$, from 0.3% to 0.4% $SiO_2$ and about 0.3% $Fe_2O_3$ plus $Al_2O_3$ and about 0.9% CaO, said particles being characterized by crystal-to-crystal bonding of magnesia crystals, (b) 0.14% pumicite of particle size passing 100 mesh and over 50% passing 325 mesh, and (c) 0.36% hydrated lime substantially all passing 200 mesh, said batch exhibiting on the fired basis a lime-to-silica ratio of between about 2.0/1 and about 2.5/1.

10. A method of making a fired refractory shape for use in high temperature metallurgical furnaces characterized by direct bonding between periclase particles in said shape, consisting essentially of admixing (a) periclase particles in brickmaking size ranges and containing at least 97.5% MgO, from about 0.1 to 0.25% chromium expressed as $Cr_2O_3$ and not over about 0.50% ferric oxide plus alumina, (b) from about 0.1 to 0.2% silica substantially entirely passing 100 mesh and a major portion thereof passing 325 mesh, and (c) sufficient calcium compound passing 200 mesh and adapted to form CaO upon firing to provide a lime-to-silica ratio in the fired product of from about 1.75/1 to about 2.6/1, (d) a tempering amount of water, and (e) from about 1% to about 3% of a chemical bonding agent, intimately admixing, forming into shape, and firing at a temperature of at least 1650° C. to form a fired product exhibiting direct bonding between periclase particles, segregated zones of dicalcium silicate and a modulus of rupture at 1260° C. of at least 1050 p.s.i.

References Cited

UNITED STATES PATENTS

| | | | |
|---|---|---|---|
| 2,238,428 | 4/1941 | Seaton et al. | 106—58 |
| 2,571,101 | 10/1951 | Austin | 106—58 |
| 2,571,134 | 10/1951 | Hicks et al. | 106—59 |
| 2,572,688 | 10/1951 | Austin | 106—58 |
| 3,106,475 | 10/1963 | Davies et al. | 106—58 |
| 3,141,790 | 7/1964 | Davies et al. | 106—58 |

OTHER REFERENCES

Hicks and Davis, The Iron Age, Aug. 1959, pp. 98–105, 157, 158.

Van Dreser, Blast Furnace and Steel Plant, April, 1964, pp. 334–338, 341, 349.

White, J. Special Report of the Iron and Steel Institute, London, 1962, pp. 15, 16.

JAMES E. POER, Primary Examiner

U.S. Cl. X.R.

106—59, 63

UNITED STATES PATENT OFFICE
CERTIFICATE OF CORRECTION

Patent No. 3,473,939                        October 21, 1969

Marshall L. Mayberry et al.

It is certified that error appears in the above identified patent and that said Letters Patent are hereby corrected as shown below:

Column 1, line 72, "space" should read -- shape --. Column 3, line 20, "$2CaO.CiO_2$" should read -- $2CaO.SiO_2$ --; line 68, "desnity" should read -- density --. Column 6, line 74 "C133-35" should read -- C133-55 --. Column 7, line 18, "to" should read -- of --.

Signed and sealed this 5th day of May 1970.

(SEAL)
Attest:

Edward M. Fletcher, Jr.                     WILLIAM E. SCHUYLER, JR.
Attesting Officer                              Commissioner of Patents